United States Patent
Oba et al.

(10) Patent No.: US 7,735,263 B2
(45) Date of Patent: Jun. 15, 2010

(54) WEATHER STRIP FOR MOTOR VEHICLE

(75) Inventors: Kisato Oba, Aichi-ken (JP); Masahiro Nozaki, Aichi-ken (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 546 days.

(21) Appl. No.: 11/476,030

(22) Filed: Jun. 28, 2006

(65) Prior Publication Data

US 2007/0000180 A1 Jan. 4, 2007

(30) Foreign Application Priority Data

Jun. 30, 2005 (JP) .............................. 2005-191472

(51) Int. Cl.
*E06B 7/16* (2006.01)
(52) U.S. Cl. ..................... 49/490.1; 49/498.1
(58) Field of Classification Search ............... 49/490.1, 49/498.1, 475.1; 296/146.9
See application file for complete search history.

(56) References Cited

U.S. PATENT DOCUMENTS

| | | | | |
|---|---|---|---|---|
| 4,304,816 A | * | 12/1981 | Bright et al. ................. | 428/358 |
| 4,474,402 A | * | 10/1984 | Shelton ........................ | 296/76 |
| 4,542,610 A | * | 9/1985 | Weimar ....................... | 49/490.1 |
| 4,617,220 A | * | 10/1986 | Ginster ........................ | 428/122 |
| 4,678,227 A | * | 7/1987 | Castagno ..................... | 296/213 |
| 5,304,409 A | * | 4/1994 | Nozaki ........................ | 428/122 |
| 5,423,147 A | * | 6/1995 | Dupuy ........................ | 49/490.1 |
| 5,449,544 A | * | 9/1995 | Ogawa et al. ................ | 428/122 |
| 5,715,632 A | * | 2/1998 | Nozaki ........................ | 49/475.1 |
| 5,840,401 A | * | 11/1998 | Baesecke ..................... | 428/122 |
| 6,250,018 B1 | * | 6/2001 | Kawai et al. ................. | 49/479.1 |
| 6,874,281 B2 | * | 4/2005 | Fujita et al. ................. | 49/490.1 |
| 6,948,719 B2 | * | 9/2005 | Dron ........................... | 277/628 |
| 7,293,820 B2 | * | 11/2007 | Hashimoto et al. .......... | 296/146.9 |

FOREIGN PATENT DOCUMENTS

| | | |
|---|---|---|
| JP | 54-31622 | 3/1979 |
| JP | 6-48258 | 2/1994 |
| JP | 2000-219048 | 8/2000 |
| JP | 2001-151035 | 6/2001 |
| JP | 2002-137695 | 5/2002 |

* cited by examiner

*Primary Examiner*—Katherine W Mitchell
*Assistant Examiner*—Michael J Keller
(74) *Attorney, Agent, or Firm*—McGinn IP Law Group, PLLC

(57) ABSTRACT

A weather strip for a motor vehicle, capable of being readily attached to a flange with a low extensibility, and securely preventing noises from being transmitted via the flange. The weather strip includes a base portion for attachment to the flange, and a seal portion integrally formed with the base portion for sealing between an opening portion and a closing member. The base portion includes at least an outer side wall and a bottom wall, a double-sided adhesive tape is bonded to an interior surface of the outer side wall, and at least one part of the outer side wall and the bottom wall is composed of a hard material such as a hard rubber, which is harder than a material of the remaining part thereof, and a material exhibiting a low extensibility, such as a resin sheet, is stuck to or embedded in the outer side wall and/or the bottom wall.

14 Claims, 6 Drawing Sheets

WEATHER STRIP FOR MOTOR VEHICLE

CROSS-REFERENCE TO RELATED APPLICATION

This application is related to and claims priority from Japanese patent application No. 2005-191472, incorporated herein by reference.

BACKGROUND OF THE INVENTION

1. Field of the Invention

The present invention relates to a weather strip for providing a seal between an opening portion of a vehicle body and a closing member for closing the opening portion, such as a vehicle door, a luggage door, a sliding roof, etc.

2. Description of Related Art

FIG. 1 is a cross-sectional view of a conventional sealing structure between a door opening portion of a vehicle body and a vehicle door. As shown, to provide a seal between a door opening portion 10 and a vehicle door 12, a door weather strip 14 is attached to a retainer 16 provided along an outer periphery of a door frame, a glass run 18 is attached to a channel 20 provided along an inner periphery of the door frame, and a door opening trim weather strip 22 is attached to a flange 24 projecting from the door opening portion 10. The flange 24 is formed by joining end edges of an outer body panel 26 and an inner body panel 28 of the vehicle body.

The glass run 18 includes an outer side wall 30, a bottom wall 32 and an inner side wall 34, and has a generally U-shaped cross-section. When a door glass 36 is raised, an end of the door glass 36 enters an interior of the glass run 18, and is sealed with an outer seal lip 38 and an inner seal lip 40 extending from open ends of the outer side wall 30 and the inner side wall 34, respectively.

The door weather strip 14 attached to the outer periphery of the door 12 includes a base portion 42, a tubular seal portion 44 integrally formed on the base portion 42, and a seal lip 46. The base portion 42 is secured to the door frame by fitting the base portion 42 in the retainer 16 provided along the outer periphery of the door frame. When the door 12 is closed, the seal lip 46 contacts an outer end of the door opening portion 10 and the tubular seal portion 44 contacts a protruding part of the door opening portion 10 on the inner side of the contacting position of the seal lip 46 to provide a seal between the door opening portion 10 and the vehicle door 12.

The door opening trim weather strip 22 attached to the flange 24 provides a seal between the door opening portion 10 and the vehicle door 12 on the inner side of the contacting position of the tubular seal portion 44 of the door weather strip 14. The door opening trim weather strip 22 includes a base portion 48 having a U-shaped cross-section and a tubular seal portion 50. The base portion 48 is attached to the flange 24 and the tubular seal portion 50 contacts a protruding part 52 of the door frame to provide a seal between the door opening portion 10 and the vehicle door 12. An insert member 54 such as a metal insert, etc. is embedded in the base portion 22, and lips are provided in the base portion 48 for holding the flange 24.

In many cases, the door opening trim weather strip 22 is attached over the entire circumference of the door opening portion 10. The number of body panels forming the flange 24 depends on the position in the door opening portion 10 and varies from two to five, and consequently, the thickness of the flange 24 varies from about 2 mm to about 8 mm.

Therefore, where the base portion 48 has a generally U-shaped section and the metal insert member 54 is embedded for holding the flange 24, the force required for inserting the flange 24 may increase or the holding force against the flange 24 may decrease according to the attaching position. In this case, the weight of the door opening trim weather strip 22 increases so as not to respond to the demand for the decrease in the vehicle weight.

Under the above-described circumstances, as shown in FIG. 2, there has been also carried out the method of removing the insert member such as the metal insert from a base portion 56 to enhance the flexibility thereof, and attaching the resultant flexible base portion 56 to the flange 24 using a double-sided adhesive tape 58 (see Publications of unexamined Japanese patent applications Nos. 2001-151035 and 2002-137695, ex.).

In this case, the double-sided adhesive tape 58 is bonded to an interior surface of an outer side wall 60 of the base portion (trim portion) 56, the flange 24 is inserted in an interior of the trim portion 56, and the double-sided adhesive tape 58 is pressed against an exterior surface of the flange 24.

In another case shown in FIG. 3, one side wall of a trim portion 62 is formed short, a double-sided adhesive tape 64 is bonded to a longer side wall of the trim portion 62, a projecting end of the flange 24 is inserted in a bottom of an interior of the trim portion 62, and the trim portion 62 is turned in the direction of the arrow to bond the double-sided adhesive tape 64 to the flange 24 (see U.S. Pat. No. 3,180,493, ex.).

However, where the metal insert is removed as described above, the extensibility in the longitudinal direction of the door opening trim weather strip increases. Consequently, when the door opening trim weather strip is attached along the door opening portion, the door opening trim weather strip elongates and it may lift from the flange in the door opening portion, or generate wrinkles. In addition, there arises the problem that the dimensions of products may vary due to the remaining stress in the manufacturing step, the temperature change in the assembling step, the elongation and shrinkage occurring during the storage of the products, etc., thereby causing the door opening trim weather strip to lift from the door opening portion or to generate wrinkles.

And upon bonding the door opening trim weather strip to the flange using the double-sided adhesive tape, a protecting tape is peeled from the adhesive tape, the flange is inserted in an interior of the trim portion, and the double-sided adhesive tape is pressed against a side surface of the flange. In this case, a projecting end of the flange may contact the double-sided adhesive tape to cause the peeling of the double-sided adhesive tape, or the flange may be undesirably bonded to the double-sided adhesive tape before inserted into a bottom of the trim portion.

And, as shown in FIG. 1, the flange 24 is formed by joining end edges of the outer body panel 26 and an inner body panel 28 to each other by welding or other method, and the outer body panel 26 and the inner body panel 28 define a cavity adjacently to the flange 24. Various noises such as wind noises, tire noises, road noises, etc. are transmitted over the entire circumference of the door opening portion via this cavity. There are formed protrusions and depressions in the flange 24 due to the spot welding or the sheet metal processing to define gaps between adjacent body panels. And the above-described noises leak via these gaps and are transmitted to a vehicle compartment.

In order to overcome this problem and improve the sealing properties around the flange 24, in the conventional example shown in FIG. 4, a sponge rubber 68 is attached to an interior of a trim portion 70 for contacting the projecting end of the flange 24 (see Publication of unexamined Japanese patent application No. 2000-219048 and Publication of unexamined Japanese utility model application No. Sho 54-31622, ex.).

In this example, a holding lip 72 provided in the interior of the trim portion 70 holds the flange 24, and the projecting end of the flange 24 merely contacts an interior surface of the sponge rubber 68. Therefore, the positioning of the projecting end of the flange 24 is insufficient so that sufficient sealing properties cannot be effected between the projecting end of the flange 24 and the sponge rubber 68.

SUMMARY OF THE INVENTION

Accordingly, it is an object of the present invention to provide a weather strip for a motor vehicle, which neither elongate nor shrink upon attachment thereof, can be readily attached and can securely prevent noises from being transmitted to a vehicle compartment.

In accordance with a first aspect of the present invention, a weather strip for a motor vehicle, which is capable of providing a seal between an opening portion of a vehicle body, and a closing member for closing the opening portion, includes a base portion for attachment to a flange provided in the opening portion or the closing member, and a seal portion integrally formed with the base portion for contacting the opening portion or the closing member, and sealing a gap between the opening portion and the closing member. The base portion has at least a bottom wall and an outer side wall, a double-sided adhesive tape is bonded to an interior surface of the outer side wall, and at least one part of the outer side wall and the bottom wall is composed of a hard material which is harder than that of the remaining part thereof.

With this arrangement, the base portion has at least a bottom wall and an outer side wall so that where the thickness of the flange varies, the bottom wall securely holds the projecting end of the flange while a side surface of the flange contacts the outer side wall of the base portion, whereby a seal is provided between the flange and the base portion. By bringing the projecting end of the flange into contact with the bottom wall, the outer side wall of the base portion can be attached to the flange in position.

In addition, the double-sided adhesive tape is bonded to the interior surface of the outer side wall, the base portion can be attached to the flange regardless of the thickness of the flange with a great bonding area of the double-sided adhesive tape, whereby the base portion can be bonded strongly.

Since at least one part of the outer side wall and the bottom wall is composed of a hard material which is harder than that of the remaining part thereof to restrain the extensibility of the base portion. Upon attaching to the flange, the weather strip can be prevented from greatly elongating relative to the flange so that the weather strip can be prevented from partly lifting from the flange or generating wrinkles. As a result, the weather strip can be formed into a ring-shaped configuration and attached to the flange quickly and readily.

In accordance with a second aspect of the present invention, the hard material is a hard rubber or a hard synthetic resin so as to be readily formed simultaneously with the extrusion of the weather strip using an extruding machine.

In accordance with a third aspect of the present invention, a weather strip for a motor vehicle, which is capable of providing a seal between an opening portion of a vehicle body, and a closing member for closing the opening portion, includes a base portion for attachment to a flange provided in the opening portion or the closing member, and a seal portion integrally formed with the base portion for contacting the opening portion or the closing member, and sealing a gap between the opening portion and the closing member. The base portion has at least a bottom wall and an outer side wall, a double-sided adhesive tape is bonded to an interior surface of the outer side wall, and a member exhibiting a low extensibility is stuck to or embedded in at least one part of the outer side wall and/or the bottom wall.

With this arrangement, the base portion has at least a bottom wall and an outer side wall so that where the thickness of the flange varies, the bottom wall securely holds the projecting end of the flange while a side surface of the flange contacts the outer side wall of the base portion, whereby a seal is provided between the flange and the base portion. By bringing the projecting end of the flange into contact with the bottom wall, the outer side wall of the base portion can be attached in position.

In addition, the double-sided adhesive tape is bonded to the interior surface of the outer side wall, the base portion can be attached to the flange regardless of the thickness of the flange with a great bonding area of the double-sided adhesive tape, whereby the base portion can be bonded strongly.

Since a member exhibiting a low extensibility is stuck to or embedded in at least one part of the outer side wall and/or the bottom wall, the base portion can be prevented from greatly elongating relative to the flange when the weather strip is attached to the flange, so that the weather strip can be prevented from lifting from the flange or generating wrinkles. As a result, the weather strip can be formed into a ring-shaped configuration and attached to the flange quickly and readily. In addition, the member exhibiting a low extensibility has a great flexibility in the transverse direction, thereby increasing the bending properties of the weather strip to facilitate the attachment to the flange. In addition, since the member exhibiting a low extensibility can be stuck or embedded simultaneously with the extrusion of the base portion, the weather strip can be readily formed. Since the material exhibiting a low extensibility can be selected independently of the material for the base portion, such material can be selected among various materials.

Other objects, features, and characteristics of the present invention will become apparent upon consideration of the following description and the appended claims with reference to the accompanying drawings, all of which form a part of this specification.

DETAILED DESCRIPTION OF THE PREFERRED EMBODIMENTS

Hereinafter, embodiments of the present invention will be explained with reference to door opening trim weather strips 74 and 76. The present invention can be also applied to other weather strips, each including a base portion and a sealing portion and being used in an opening portion of a vehicle body and a closing member for sealing between the opening portion and the closing member, such as sliding roof weather strips, luggage weather strips, rear door weather strips, etc.

The present invention will be explained based on FIGS. 5 through 10.

Figure 1:
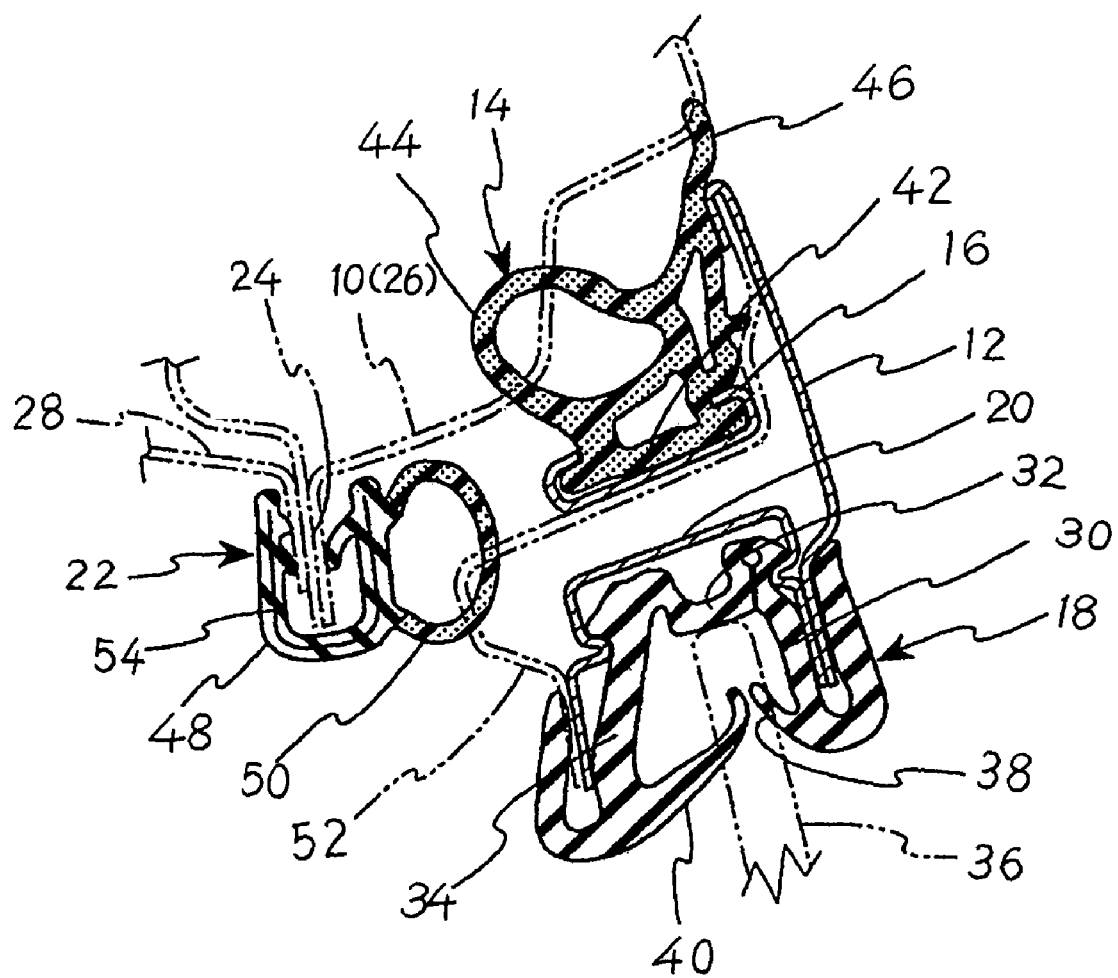
FIG. 1 is a cross-sectional view of one example of a conventional door opening trim weather strip which is attached to a door opening portion of a motor vehicle.
Figure 2:
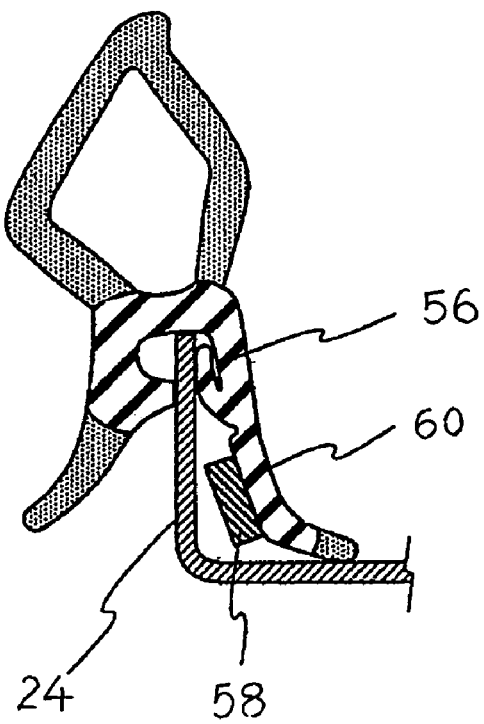
FIG. 2 is a partially cut away cross-sectional view of another example of a conventional door opening trim weather strip which is attached to a door opening portion of a motor vehicle.
Figure 3:
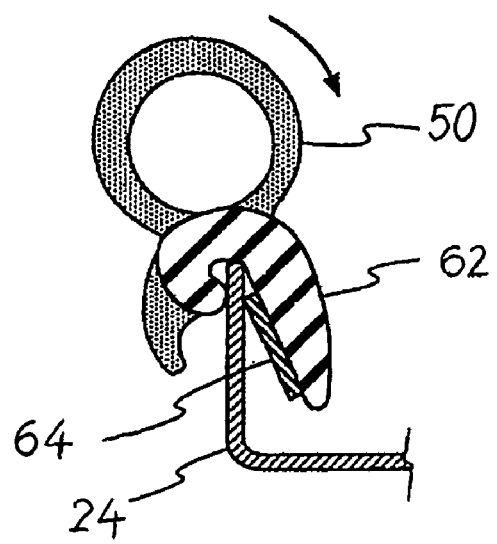
FIG. 3 is a partially cut away cross-sectional view of still another example of a conventional door opening trim weather strip which is attached to a door opening portion of a motor vehicle.
Figure 4:
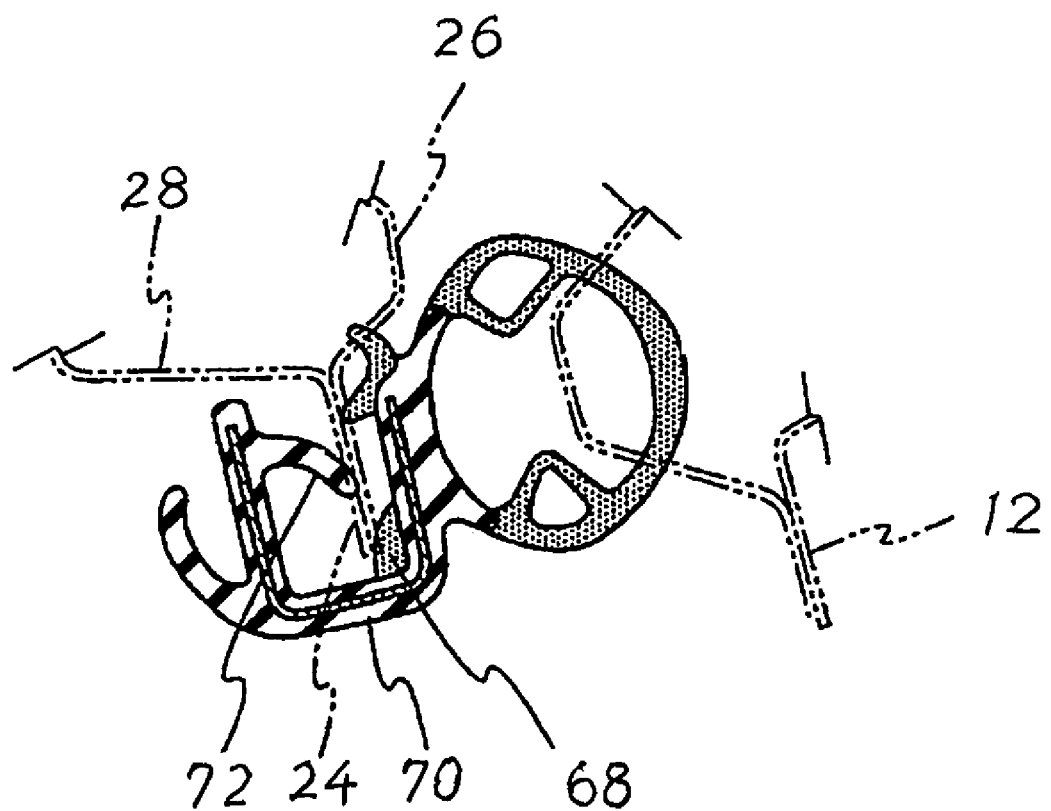
FIG. 4 is a partially cut away cross-sectional view of a further example of a conventional door opening trim weather strip which is attached to a door opening portion of a motor vehicle.
Figure 5:
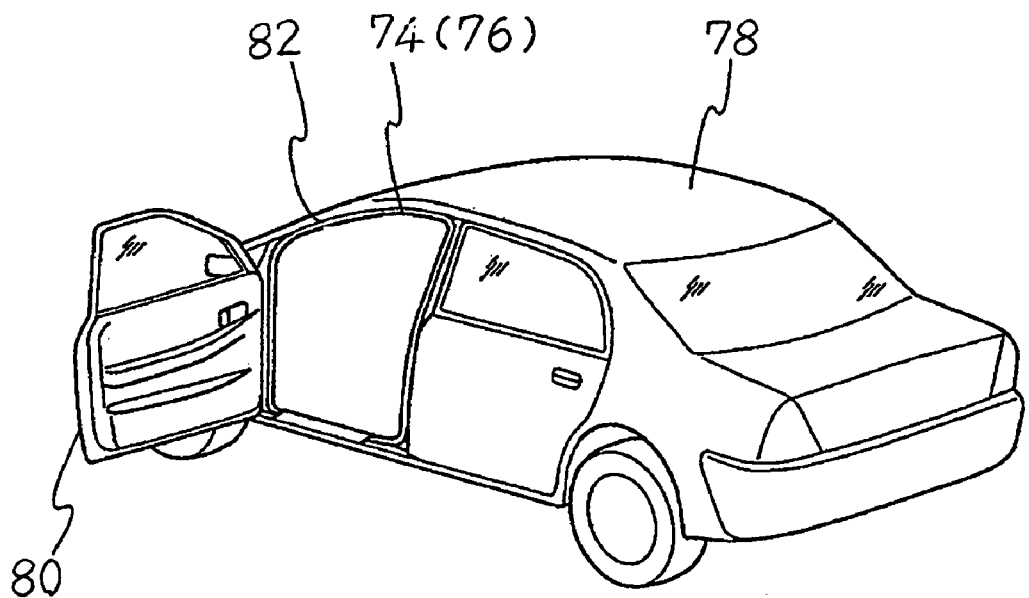
FIG. 5 is a perspective view of a vehicle body, which shows an attaching state of a door opening trim weather strip as one example of a weather strip in accordance with the present invention.
Figure 6:
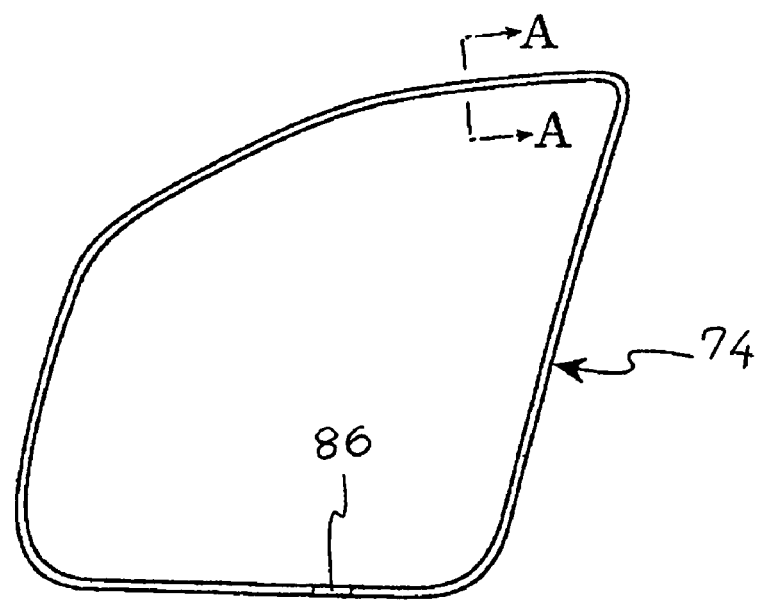
FIG. 6 is a front view of the door opening trim weather strip of FIG. 5.

FIG. 5 is a perspective view of a motor vehicle, which shows an attaching state of a door opening trim weather strip to an opening portion of a vehicle body, and FIG. 6 is a front view of the door opening trim weather strip to be attached to the opening portion of the vehicle body.

As shown in FIG. 5, a vehicle body 78 includes a door opening, and the door opening is closed by a vehicle door 80. A door opening portion 82 is formed around the door opening of the motor vehicle. End edges of an outer body panel and an inner body panel are welded to each other to form a flange 84 (FIGS. 7 through 10) around the door opening portion 82, and a door opening trim weather strip 74 is attached to the flange 84 for providing a seal between the door opening portion 82 and the vehicle door 80. The number of the body panels to be welded generally ranges from two to five according to the position in the door opening portion 82, and consequently, the thickness of the flange 84 varies according to the position of the vehicle body.

The door opening trim weather strip 74 is formed by extrusion into a linear configuration, and, as shown in FIG. 6, the linear door opening trim weather strip 74 is attached to the flange 84 along the door opening portion 82 into a ring-shaped configuration. After attaching, ends of the door opening trim weather strip 74 are connected to each other. The ends of the door opening trim weather strip 74 may be connected to each other with a connection 86 formed by molding into a ring-shaped configuration.

Alternatively, the ends of the door opening trim weather strip 74 may be bonded to each other with an adhesive agent into a ring-shaped configuration before attaching to the door opening portion 82. By forming the door opening trim weather strip 74 into a ring-shaped configuration, the door opening trim weather strip 74 can be readily attached.

Figure 7:
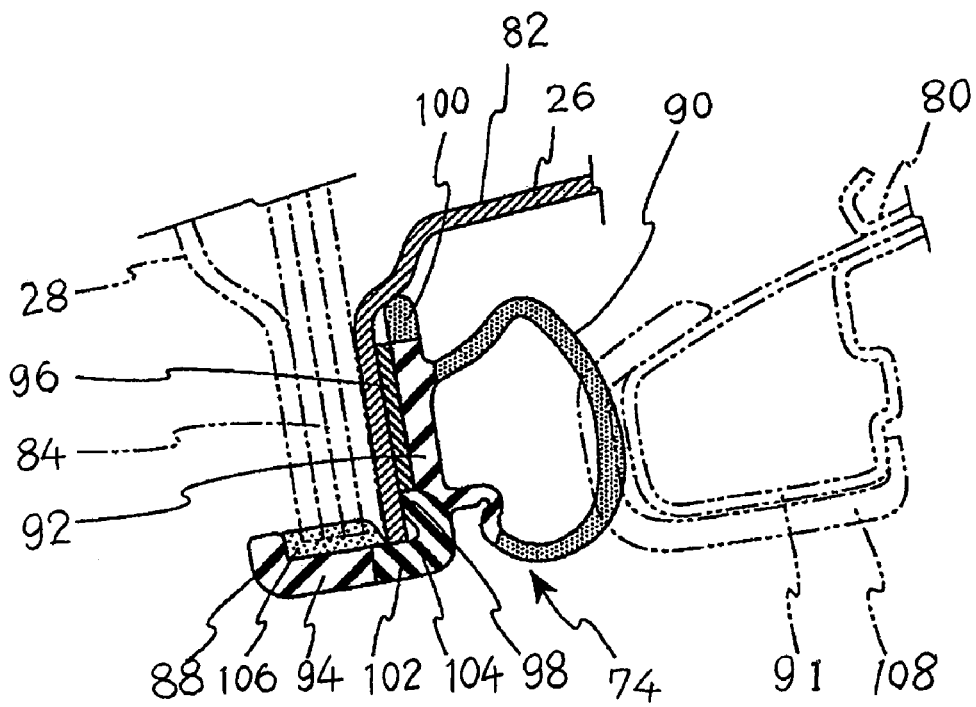
FIG. 7 is a cross-sectional view of a first embodiment of a door opening trim weather strip in accordance with the present invention, which is taken along the line A-A of FIG. 6.

Hereinafter, a first embodiment of a door opening trim weather strip 74 will be explained with reference to FIG. 7. As shown, the door opening trim weather strip 74 has a trim portion (base portion) 88 for attachment to the flange 84, and a tubular seal portion 90 for contacting a protruding part 91 of a door frame of the vehicle door 80 and providing a seal between the vehicle door 80 and the door opening portion 82. The trim portion 88 includes an outer side wall 92 and a bottom wall 94, and has a generally L-shaped cross-section. To attach the trim portion 88 to the flange 84 securely regardless of the variations of the thickness of the flange 84, the bottom wall 94 is formed to have a predetermined width. The outer side wall 92 and the bottom wall 94 of the trim portion 88 are formed integrally and continuously with each other. No metal plate nor insert member composed of a hard synthetic resin, etc., which is adapted to reinforce the holding force for the flange 84, is embedded in the trim portion 88. Therefore, the door opening trim weather strip 74 can be made lightweight.

The outer side wall 92 is formed to have a generally plane plate-shaped cross-section, and a double-sided adhesive tape 96 is bonded to an interior surface thereof. The door opening trim weather strip 74 is bonded to an exterior side face of the flange 84 with the double-sided adhesive tape 96.

Where the double-sided adhesive tape 96 is used, a similar bonding method is applicable regardless of the variations of the thickness of the flange 84, because the double-sided adhesive tape 96 is bonded only to the exterior surface of the flange 84, and consequently, a similar bonding force against the flange 84 can be effected so that the attachment of the door opening trim weather strip 74 is facilitated. In addition, where the double-sided adhesive tape 96 is bonded to the outer side wall 92, the bonding area can be enlarged, and consequently, the trim portion 88 can be bonded securely.

Where the double-sided adhesive tape 96 is composed of a sponge material and the thickness thereof is made large, or the outer side wall 92 is composed of a sponge material, the double-sided adhesive tape 96 can deform according to irregularities such as spot welding concaves formed in the exterior surface of the flange 84 and can be brought into close contact with the exterior surface of the flange 84.

A protrusion 98 may be provided along a bottom end of the outer side wall 92 in the direction of an interior of the trim portion 88. By bonding a lower edge of the double-sided adhesive tape 96 to this protrusion 98, the double-sided adhesive tape 96 can be positioned, and consequently, the double-sided adhesive tape 96 can be bonded to a predetermined position of the flange 84.

A projection 100 composed of a sponge material is integrally formed along an open end of the outer side wall 92. When the outer side wall 92 is attached to the flange 84, the projection 100 contacts a bending part of the outer body panel 26 to provide a seal between the door opening trim weather strip 74 and the outer body panel 26.

The bottom wall 94 is formed to have a generally plane plate-shaped cross-section, and a joint part between the bottom wall 94 and the outer side wall 92 is composed of a hard material 102. The hard material 102 is formed continuously and integrally with the outer side wall 92 and the bottom wall 94 in the area ranging from about the protrusion 98 of the outer side wall 92 to about a widthwise center of the bottom wall 94.

When the projecting end of the flange 84 contacts the bottom wall 94 and is pressed thereagainst, the joint part composed of the hard material 102 does not greatly deform so that the bonding position of the outer side wall 92 against the flange 84 can be determined. As a result, the flange 84 can be held securely.

This hard material 102 may be provided in only one of the bottom wall 94 and the outer side wall 92. A hard rubber or a hard synthetic resin may be used as the hard material 102. A hard EPDM rubber with a JIS hardness of HA90° to 95°, etc. can be used as the hard rubber, whereas a hard polyethylene, a hard polypropylene, etc. can be used as the hard synthetic resin. In addition, a thermoplastic olefin elastomer with a JIS hardness of A90/S to A95/S(JIS K 6253) can be also used.

These hard materials exhibit a low extensibility, and do not elongate greatly relative to the flange 84 upon attaching the door opening trim weather strip 74 to the flange 84. Therefore, the door opening trim weather strip 74 is free from the problem that one part thereof lifts from the flange 84 or wrinkles are generated therein.

Where a hard EPDM rubber, a hard polyethylene, a hard polypropylene, etc. are used as the hard material, whereas the remaining part is composed of a soft EPDM rubber, or thermoplastic olefin elastomer, the hard material 102 can be formed simultaneously with the door opening trim weather strip 74 by extrusion using an extruding machine.

The remaining part of the trim portion 88 can be formed of a soft EPDM rubber or thermoplastic olefin elastomer with a JIS hardness of A60/S to A85/S(JIS K 6253)°, thereby exhibiting both a sufficient strength capable of holding the flange 84 and a sufficient flexibility capable of changing their configurations according to the variations of the configuration of the flange 84.

A stepped part 104 is formed in an interior surface of the bottom wall 94 adjacently to the joint portion between the outer side wall 92 and the bottom wall 94 for holding the projecting end of the flange 84. The stepped part 104 may be formed in the bottom wall 94 into an L-shaped cross-section, or may be defined with a side surface of a later describing calking sponge 106 and the interior surface of the bottom wall 94.

When the trim portion 88 is attached to the flange 84, the projecting end of the outer body panel 26 enters the stepped part 104 and held therein in contact with the calking sponge 106. As a result, the attaching position of the door opening trim weather strip 74 against the flange 84 can be determined securely.

Where the stepped part 104 is composed of a hard rubber, it exhibits a sufficient hardness so as not to be deformed when the projecting end of the outer body panel 26 contacts the stepped part 104.

The calking sponge 106 is bonded to the interior surface of the bottom wall 94. Instead of the sponge material, other flexible material may be used provided that the projecting end of the flange 84 can be embedded therein and sealed therewith. The calking sponge 106 is bonded to the interior surface of the bottom wall 94 on an inner side of the stepped part 104.

In the present embodiment, the joint portion between the bottom wall 94 and the outer side wall 92 is entirely composed of the hard material 102. Alternatively, only an interior side of the bottom wall 94 in the joint portion may be composed of the hard material 102. In this case, an exterior side of the bottom wall 94 in the joint portion is composed of the same material as that of the outer side wall 92.

The hard material 102 can be composed of a hard rubber with a JIS hardness of A85/S to A95/S(JIS K 6253), ex. When the projecting end of the flange 84 contacts the stepped part 104, it exhibits a sufficient hardness so as not to deform greatly. The remaining part of the bottom wall 94 can be composed of a soft rubber with a JIS hardness of A60/S to A80/S(JIS K 6253). Consequently, the door opening trim weather strip 74 exhibits both a sufficient strength capable of holding the flange 84 and a sufficient extensibility capable of following the variations of the thickness of the flange 84 caused by the increment of the panels of the flange 7 and the irregularities in the flange 84 caused by the spot welding.

The tubular seal portion 90 is integrally formed on an outer surface of the outer side wall 92 to have a generally elliptical cross-section. The tubular seal portion 90 is composed of a sponge material such as a sponge rubber, a sponge thermoplastic elastomer, etc. When the vehicle door 80 is closed, the tubular seal portion 90 contacts the protruding part 91 of the vehicle door 80 to provide a seal between the vehicle door 80 and the door opening portion 82.

A garnish 108 may be attached to the protruding part 91 of the vehicle door 80 for improving the appearance thereof. In this case, the tubular seal portion 90 contacts the garnish 108. The tubular seal portion 90 can be provided by extending the bottom wall 94 outwardly according to the position of a facing member to be contacted.

Instead of the tubular seal portion 90, a lip-shaped seal portion may be provided on an exterior surface of the outer side wall 92.

When the door opening trim weather strip 74 of the first embodiment is attached to the flange 84, first, the trim portion 88 is located obliquely to the flange 84, and the projecting end of the flange 84 is brought into contact with the bottom wall 94. Since the trim portion 88 does not have any inner side wall, the flange 84 can be inserted in the interior of the trim portion 88 by tilting the flange 84 with respect to the trim portion 88.

Since the outer body panel 26 located on an outermost side of the flange 84 projects slightly long as compared with remaining panels of the flange 84 so that a projecting end of the outer body panel 26 contacts the stepped part 104 of the bottom wall 94. At this time, an exterior surface of the outer body panel 26 contacts the protrusion 98 of the outer side wall 92.

Next, the trim portion 88 is turned to press the double-sided adhesive tape 96 against the exterior surface of the flange 84. And the tubular seal portion 90 is compressed with a roller, whereby the double-side adhesive tape 96 is bonded to the flange 84. Since the projecting end of the outer body panel 26 can slide on the surface of the hard material 102, the outer body panel 26 shifts inwardly with the turning of the trim portion 88 and contacts a side surface of the calking sponge 106. Consequently, the double-sided adhesive tape 96 can face the exterior surface of the flange 84 to enable the double-sided adhesive tape 96 to be compressed and bonded to the flange 84.

Figure 8:
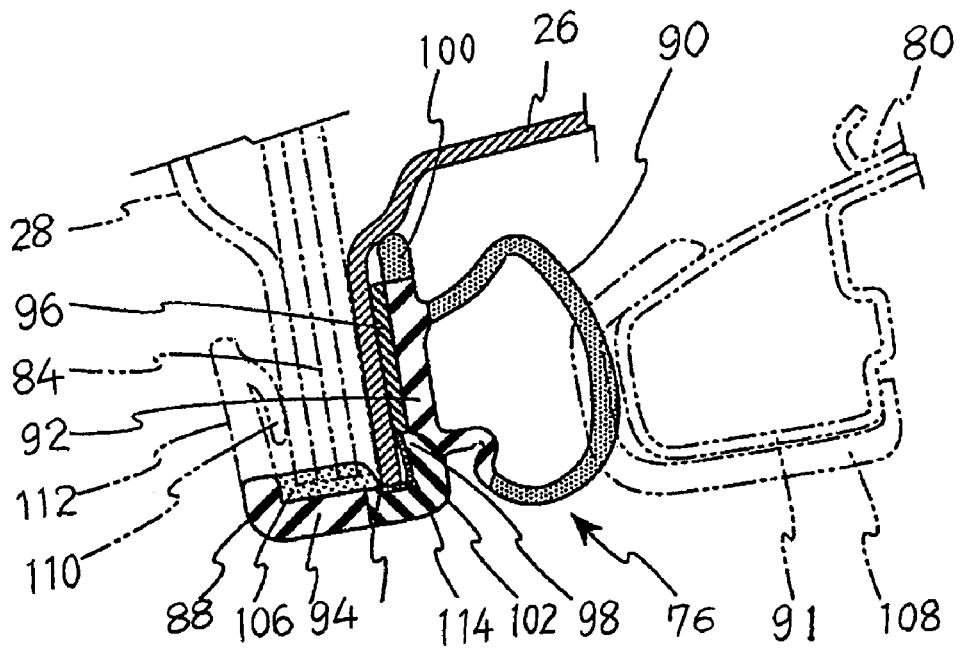
FIG. 8 is a cross-sectional view of a second embodiment of a door opening trim weather strip, which is taken along the line A-A of FIG. 6.

Alternatively, the trim portion 88 may be composed of an outer side wall, an inner side wall and a bottom wall to have a U-shaped cross-section. In this case, these walls of the trim portion 88 are integrally and continuously formed with each other, and no insert nor core member which is composed of a metal plate, a hard synthetic resin, etc. is embedded so that the trim portion can flexibly deform according to the configuration of the flange 84.

Where the trim portion 88 is formed to have a U-shaped cross-section, as shown by two-dot chain line in FIG. 8, a holding lip 110 can be provided along an open end of an inner side wall 112 so as to project in the interior of the trim portion 88 angularly to the inner side wall 112 for contacting an interior surface of the flange 84. With this arrangement, the interior surface of the flange 84 can be sealed and the flange 84 can be held together with the outer side wall 92. In addition, where the thickness of the flange 84 varies, the holding lip 110 can flex according to the variations of the thickness of the flange 84, thereby effecting good holding properties and sealing properties.

Next, a second embodiment of the present invention will be explained with reference to FIG. 8. The second embodiment differs from the first embodiment in that a material exhibiting a low extensibility is stuck to or embedded in the trim portion 88 of the door opening trim weather strip 76. This difference will be mainly explained and explanation of similar arrangement to that of the first embodiment will be omitted.

In the present embodiment, the trim portion 88 includes an outer side wall 92 and a bottom wall 94, and has a generally L-shaped cross-section. Alternatively, as described above, the trim portion may be composed of an outer side wall, an inner side wall and a bottom wall to have a U-shaped cross-section.

A resin sheet 114 exhibiting a low extensibility is provided in an interior surface of the trim portion 88 ranging from the protrusion 98 to the calking sponge 106. The joint part between the outer side wall 92 and the bottom wall 94, which ranges from the protrusion 98 to about a widthwise center of the bottom wall 94, may be composed of the hard material 102 continuously and integrally.

Figure 9:
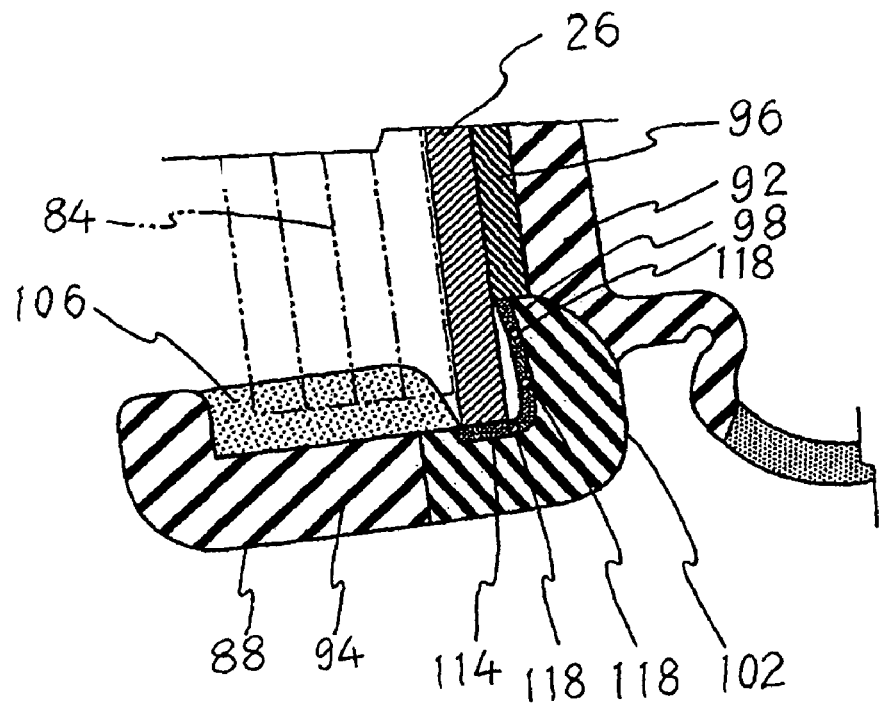
FIG. 9 is a partially enlarged cross-sectional view of the second embodiment of the door opening trim weather strip, which shows one example of the configuration of a member exhibiting a low extensibility provided between a bottom wall and an outer side wall thereof.

In the example shown in FIG. 9, the resin sheet 114 exhibiting a low extensibility is composed of polyethylene. A wire composed of an aramid fiber as a wire member 118 is integrally embedded in the resin sheet 114. A polypropylene sheet, etc. can be used as the resin sheet 114, and an iron wire, a polyester fiber, etc. can be used as the wire member 118.

Only the resin sheet 114 may be stuck to the trim portion 88, but, as shown in FIG. 9, by embedding the wire member 118 in the resin sheet 114, the shrinkage or the elongation of the joint part can be reduced. By composing the joint part of the trim portion 88 of the hard material 102, and using the resin sheet 114, the elongation or shrinkage of the joint part can be further reduced.

Where the resin sheet 114 is used, the bonding area between the resin sheet 114 and the trim portion 88 is great, thereby preventing the elongation or shrinkage of the trim portion 88 securely, and effecting the flexibility of the door opening trim weather strip. Where the wire member 118 composed of a metal wire is embedded in the resin sheet 114, the bonding process is performed to bond the wire member 118 to the resin sheet 114. In this case, the extensibility is low, and the strength is high so that the elongation and shrinkage of the trim portion 88 can be restrained. Where the wire member 118 composed of a synthetic fiber is embedded in the resin sheet 114, the flexibility is effected, the extensibility is low, and the strength is high so that the elongation and shrinkage of the door opening trim weather strip 76 can be restrained.

Where metal wire, synthetic resin sheet or synthetic resin fiber are used together in combination, the resulting door opening trim weather strip can exhibit a high flexibility and a low extensibility suitable to the attaching position and characteristics thereof.

Figure 10:
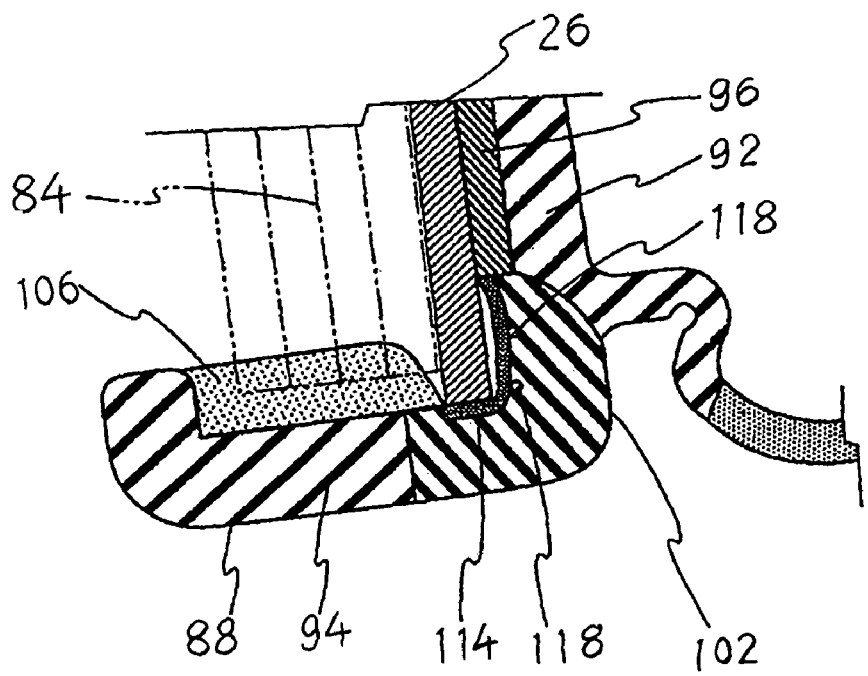
FIG. 10 is a partially enlarged cross-sectional view of the second embodiment of the door opening trim weather strip, which shows another example of the configuration of a member exhibiting a low extensibility provided between a bottom wall and an outer side wall thereof.

In the example of FIG. 10, the resin sheet 114 composed of polyethylene is used as the material exhibiting a low extensibility, similarly to the example of FIG. 9. But, as is different from the example of FIG. 9, the wire member 118 is not embedded in the resin sheet 114 but has been embedded previously in the trim portion 88. The resin sheet 114 is stuck so as to cover the wire member 118. Alternatively, the resin sheet 114 may be omitted.

A polypropylene sheet, etc. can be also used as the resin sheet 114, and a wire composed of an aramid fiber, iron, a polyester fiber, etc. can be used as the wire member 118.

Only the wire member 118 may be embedded in the trim portion 88, but by using the resin sheet 114 together with the wire member 118, the elongation and shrinkage of the trim portion 88 can be further reduced. And by composing the joint part of the hard material 102, and embedding the wire member 118 in the resultant hard joint part, the elongation and shrinkage of the trim portion 88 can be still further reduced.

Where the wire member 118 is embedded in the trim portion 88, the wire member 118 can be extruded integrally with the door opening trim weather strip 76 to facilitate the production of the door opening trim weather strip 76, and enable the strong sticking of the wire member 118 to the trim portion 88.

In the first and second embodiments, the tubular seal portion 90 is composed of a sponge material of an EPDM rubber or a thermoplastic olefin elastomer, and the trim portion 88 except for the joint part is composed of a solid material or a finely foamed material of an EPDM rubber or a thermoplastic olefin elastomer. The joint part of the trim portion 88 is composed of a solid material of an EPDM rubber or a thermoplastic olefin elastomer. With this arrangement, a resultant door opening trim weather strip exhibits good weather resistance. The resultant door opening trim weather strip is composed of olefin-based materials so that they can be recycled after pulverized together.

Next, the method for producing the door opening trim weather strips 76 and 78 will be explained.

The door opening trim weather strip 74 or 76 is formed by extrusion. A solid rubber for the trim portion 88 and a sponge rubber for the tubular seal portion 90 can be integrally extruded with an extruder.

Where the wire member 118 is embedded in the trim portion 88, the trim portion 88 and the tubular seal portion 90 are extruded together.

Where the forming material of the door opening trim weather strip 74 or 76 is composed of a solid material or a finely foamed material, a synthetic rubber such as an EPDM rubber, etc. and a thermoplastic elastomer such as a polyolefin elastomer, etc. are used. And the sponge material is prepared by foaming the above-described EPDM rubber and thermoplastic elastomer.

Polyethylene resin, polypropylene resin, a hard rubber, a hard thermoplastic elastomer, etc. can be used as the hard material.

In case of the synthetic rubber, after extruded, it is heated in a vulcanizing chamber with a hot air and high frequency wave for vulcanizing and foaming. In case of the thermoplastic elastomer or soft synthetic resin, it is heated during or after extrusion for foaming, and cooled for solidifying. Then, it is cut to predetermined lengths, whereby an extruded part of the door opening trim weather strip is obtained.

Next, the door opening trim weather strip 74 or 76 thus produced is cut to predetermined dimensions, and after connected into a ring-shaped configuration, if required, attached to the flange 84 provided in the door opening portion of the vehicle body.

As described above, with the weather strip of the present invention, a double-sided adhesive tape is bonded to an interior surface of an outer side wall of a base portion (trim portion) thereof so that the base portion can be attached to a flange extending along a door opening portion of a vehicle body regardless of the thickness of the flange. With this arrangement, the bonding area of the double-sided adhesive tape can be increased to enable the base portion to be bonded strongly.

By composing at least one part of the outer side wall and/or the bottom wall of a hard material with a low extensibility, the elongation of the weather strip relative to the flange can be reduced upon attachment to the flange so that the resultant weather strip is prevented from partly lifting from the flange or generating wrinkles.

By sticking or embedding a material exhibiting a low extensibility to or in at least one part of the outer side wall and/or the bottom wall, such material is low in extensibility in the longitudinal direction of the base portion so that the elongation of the weather strip relative to the flange can be reduced upon attachment to the flange, whereby the resultant weather strip is prevented from partly lifting from the flange or generating wrinkles. In addition, such material is high in flexibility in the transverse direction of the base portion so that the bending properties of the weather strip is enhanced. Such a material exhibiting a low extensibility can be selected independently of the material for the base portion so as to be arbitrarily selected among various materials.

While the invention has been described in connection with what are considered to be the preferred embodiments, it is to be understood that the invention is not limited to the disclosed embodiments, but, on the contrary, is intended to cover various modifications and equivalent arrangements included within the spirit and scope of the appended claims.

What is claimed is:

1. A weather strip for a motor vehicle, which is capable of providing a seal between an opening portion of a vehicle body and a closing member for closing the opening portion, comprising:
    a base portion, including at least an outer side wall and a bottom wall, in which a flange provided on the opening portion of the vehicle body is adapted to be inserted; and
    a seal portion integrally formed with said base portion for contacting the closing member, and sealing between the opening portion and the closing member,
    wherein a double-sided adhesive tape is bonded to an interior surface of said outer side wall,
    wherein a protrusion is provided on an interior surface of said outer wall adjacent to a joint portion between said outer side wall and said bottom wall in a direction of an interior of said base portion for contacting a side surface of said flange and bonding one side edge of said double-sided adhesive tape to said protrusion,
    wherein a stepped part is formed in at least an interior surface of said bottom wall adjacent to said joint portion between said outer side wall and said bottom wall for holding a projecting end of said flange,
    wherein a portion of said outer side wall and said bottom wall in an area, ranging from about said protrusion of said outer side wall to about said stepped part of said bottom wall, comprises a hard material which is harder than a material of a remaining part of said outer side wall and said bottom wall, and
    wherein an other material, different from the hard material and different from the material of the remaining part of said outer side wall and said bottom wall, exhibiting an extensibility which is less than that of the remainder of the base portion, is provided in at least one part of said outer side wall and said bottom wall by one of a sticking method and an embedding method.

2. A weather strip for a motor vehicle as claimed in claim 1, wherein said hard material comprises one of a hard rubber and a hard synthetic resin.

3. A weather strip as claimed in claim 1, wherein said other material, exhibiting an extensibility which is less than the remainder of the base portion, comprises at least one of a metal wire, a synthetic resin sheet and a synthetic fiber.

4. A weather strip as claimed in claim 1, wherein said weather strip has a linear configuration, and both ends of said weather strip are joined to each other into a ring-shaped configuration according to a configuration of said flange with a connection comprising a connecting sponge material.

5. A weather strip as claimed in claim 4, wherein said seal portion comprises a sponge material of one of an EPDM rubber and a thermoplastic olefin elastomer, said base portion, except for a part comprising said hard material, comprises one of a solid material and a finely foamed material of one of an EPDM rubber and a thermoplastic olefin elastomer, and said part comprising said hard material is provided by bonding a tape composed of a thermoplastic olefin elastomer to said at least one of said outer side wall and said bottom wall.

6. A weather strip as claimed in claim 1, wherein said base portion includes said outer side wall, an inner side wall and said bottom wall to define a generally U-shaped cross-section, and a holding lip which obliquely projects from an open end of said inner side wall towards an interior of said base portion so as to contact a side surface of said flange.

7. A weather strip as claimed in claim 1, wherein a calking member is attached to an interior surface of said bottom wall.

8. A weather strip as claimed in claim 1, wherein the stepped part is formed such that a side of the bottom wall after the step portion has a thickness greater than a thickness of a side of the bottom wall prior to the step portion.

9. A weather strip as claimed in claim 1, wherein said hard material comprises a hard rubber with a JIS hardness of A90/S to A95/S(JIS K 6253), and the remaining part of said base portion comprises a soft rubber with a JIS hardness of A60/S to A85/S(JIS K 6253).

10. A weather strip as claimed in claim 1, wherein said closing member for closing the opening portion comprises a door, and said weather strip is a door opening trim weather strip.

11. A weather strip as claimed in claim 1, wherein said base portion, except for a part composed of said hard material, comprises one of a solid material and a finely foamed material and said seal portion comprises a sponge material and has a tubular configuration.

12. A weather strip for a motor vehicle as claimed in claim 1, wherein said hard material comprises a hard synthetic resin.

13. A weather strip as claimed in claim 1, wherein said other material, exhibiting an extensibility which is less than the remainder of the base portion, comprises a synthetic resin sheet.

14. A weather strip as claimed in claim 1, wherein said other material, exhibiting an extensibility which is less than the remainder of the base portion, comprises a metal wire.

* * * * *